(Model.)

C. F. LANG & O. C. STAFFORD.
COUPLING DEVICE FOR SAND POINTS IN DRIVE WELLS.

No. 312,867. Patented Feb. 24, 1885.

WITNESSES:
Donn Twitchell
C. Sedgwick

INVENTOR:
C. F. Lang
O. C. Stafford
BY
ATTORNEYS.

UNITED STATES PATENT OFFICE.

CHARLEY F. LANG AND ORLANDO C. STAFFORD, OF RISING CITY, NEB.

COUPLING DEVICE FOR SAND-POINTS IN DRIVE-WELLS.

SPECIFICATION forming part of Letters Patent No. 312,867, dated February 24, 1885.

Application filed August 2, 1884. (Model.)

*To all whom it may concern:*

Be it known that we, CHARLEY F. LANG and ORLANDO C. STAFFORD, of Rising City, in the county of Butler and State of Nebraska, have invented a new and Improved Coupling Device for Sand-Points in Drive-Wells, of which the following is a full, clear, and exact description.

The object of our invention is to save the time and labor required for withdrawing the sand-points used in driving wells; and it consists in a coupling device that allows the disconnection of the sand-point from the pump, as hereinafter described and claimed.

Reference is to be had to the accompanying drawings, forming a part of this specification, in which similar letters of reference indicate corresponding parts in all the figures.

Figure 1:
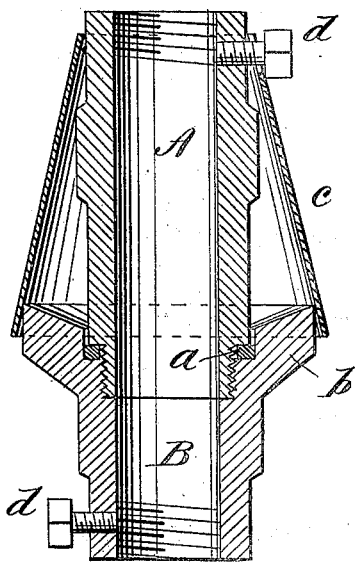
Figure 2:
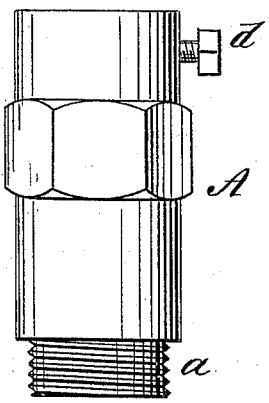
Figure 3:
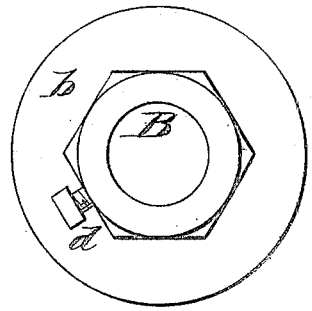

Figure 1 is a longitudinal section of the coupling device. Fig. 2 is a side view of one portion, and Fig. 3 is an end view of the other portion.

The coupling device consists of two parts, A B, both of tubular form, and connected end to end by a left-hand thread at *a*, the joint being packed to prevent leakage. The parts A B have right-hand threads at their ends for attachment to the pump-cylinder and tubing. The part B is made with a flange or rim, *b*, and to the part A is attached a tapering shield, *c*, that extends over the flange *b*. The flange serves to retain the pipe in the center of the well, so that the upper part will not miss the screw when inserted in the well.

In use the part A is screwed to the pump-cylinder and part B on the pipe that connects to the sand-point.

When the pump is to be withdrawn, it is turned to the right, so as to unscrew the device at the joint *a*, and the pump then drawn out, leaving the part B and the sand-point in the well. The shield *c* prevents dirt from falling into the pipe while the pump is being drawn out.

To prevent any possibility of the parts unscrewing except at the screw-joint *a*, the set-screws *d* are provided at the other couplings for clamping the pipes.

Having thus described our invention, we claim as new and desire to secure by Letters Patent—

1. The coupling device for drive-wells, consisting of the parts A B, having right-hand screw-threads at their outer ends and connected by a left-hand screw, substantially as described.

2. The combination of the tube A, tube B, formed with flanges *b*, and the shield *c*, substantially as described, forming a coupling for use between a pump and sand-point in driven wells, as specified.

CHARLEY F. LANG.
ORLANDO C. STAFFORD.

Witnesses:
J. C. NYCUM,
GEO. L. MATTER.